United States Patent

[11] 3,612,254

[72] Inventor Luther H. Wideman
Toledo, Ohio
[21] Appl. No. 031,555
[22] Filed Apr. 24, 1970
[45] Patented Oct. 12, 1971
[73] Assignee Owens-Illinois, Inc.

[54] CONTAINER-HANDLING CHUCK
13 Claims, 6 Drawing Figs.
[52] U.S. Cl. .................................................. 198/179,
198/22 B, 294/110, 294/115, 294/116
[51] Int. Cl. ......................................................... B65g 15/00
[50] Field of Search ............................................. 198/22 B,
131, 160, 179, 210; 294/110, 115, 116

[56] References Cited
UNITED STATES PATENTS
3,069,035  12/1962  Schwartz et al. ............... 198/179
3,125,369  3/1964  Copping ........................ 198/179

Primary Examiner—Evon C. Blunk
Assistant Examiner—I. Kenneth Silverman
Attorneys—J. R. Nelson and E. J. Holler ABSTRACT: A chuck for handling and manipulating glass containers in a container production line. The chuck includes a container seat formed to receive and center the bottom of a glass container between three or more symmetrically disposed clamping arms mounted upon the seat assembly to cooperate with the seat in holding the container in position on the chuck. The seat assembly is mounted for rotation in a chuck housing about an axis which is coincident with the axis of a container held on the seat. The housing is adapted to be carried upon an endless chain so that a series of chucks can be linked together in series and driven in succession past work stations at which various operations are performed on the containers. An operating lever carried by the housing projects to one side of the path of travel of the chucks and is engageable with stationary cams at selected points along the path to open or close the chuck to enable the chuck to receive or discharge containers. A sprocket mounted on the seat assembly is engageable with chains extending along the path of travel of the chucks to drive the chucks in rotation during their transit of selected portions of their path of movement.

3,612,254

CONTAINER-HANDLING CHUCK

BACKGROUND OF THE INVENTION

Although it has obvious utility in other environments, the chuck of the present invention was specifically designed to handle the glass container portion of the composite container disclosed in U.S. Pat. No. 3,482,724 during the formation of the container mouth or finish. As explained in the commonly owner copending application of John D. Banyas, Ser. No. 825,850, filed May 19, 1969, the glass container portions of the composite container of U.S. Pat. No. 3,482,724 are formed on a ribbon machine with an integral moil portion which extends upwardly beyond that portion of the container which is ultimately formed into the container finish. The transfer machine disclosed in the aforementioned Banyas application Ser. No. 825,850 removes the freshly formed container blanks from the forming machine by suspending the containers from the moil portion and transfers the containers to a burn-off machine which burns off the moil portion from the container blank to form the finish of the glass container. The chuck of the present invention is designed to carry the containers through the burn-off machine.

In the burn-off machine, the containers are conveyed in succession along a path which extends between a series of burners located on opposite sides of the path of movement of the containers to heat and burn off the moil portion to form the container finish. During their passage through the burners, the containers are supported by the chucks in an inverted position and are driven in rotation about their axis to achieve a uniform exposure of the containers' circumference to the burner jets.

SUMMARY OF THE INVENTION

A chuck embodying the present invention includes a housing which is adapted to be mounted upon and carried by an endless chain conveyor. Within the housing, an elongate shaft is mounted for rotation about its axis with the shaft axis extending normal to the intended path of movement of the housing. At one end, a container seat assembly is fixedly mounted upon the shaft and is formed with a concave conical seat adapted to receive and center the hemispherical bottom of the glass container. At symmetrically disposed positions about the circumference of the seat, three or more clamping arms are pivotally mounted on the seat for pivotal movement in general planes extending radially of the shaft axis. The upper ends of the arms are constructed with container-engaging pads, and the arms project downwardly below their respective pivots. Cam slots are formed in the lower ends of the arms and receive rollers commonly mounted upon an operating sleeve which is mounted for axial sliding movement on the seat assembly. The cam slots are formed with axially inclined sections so that axial movement of the sleeve within one range of movement pivots the arms between an open container-receiving or discharge position and a closed container-gripping position in which the arms cooperate with the seat to locate the container in coaxial relationship with the shaft axis. A sprocket on the shaft is engageable with a frame mounted chain to drive the shaft, seat assembly and container in rotation. A lever pivotally mounted on the housing is manipulated by cam tracks along selected sections of the path of movement to axially shift the sleeve to move the arms to their open or closed position. To accommodate for possible overtravel of the arms in their open position, the appropriate ends of the cam slots are oriented to extend, for a short section, parallel to the axial path of travel of the rollers so that over this range of movement of the operating sleeve, no pivotal movement of the arms occurs.

Other objects and features of the invention will become apparent by reference to the following specification and to the drawings.

In The Drawings:

FIG. 6 is a plan view of the seat assembly with certain parts omitted or shown in section.

Figure 1:
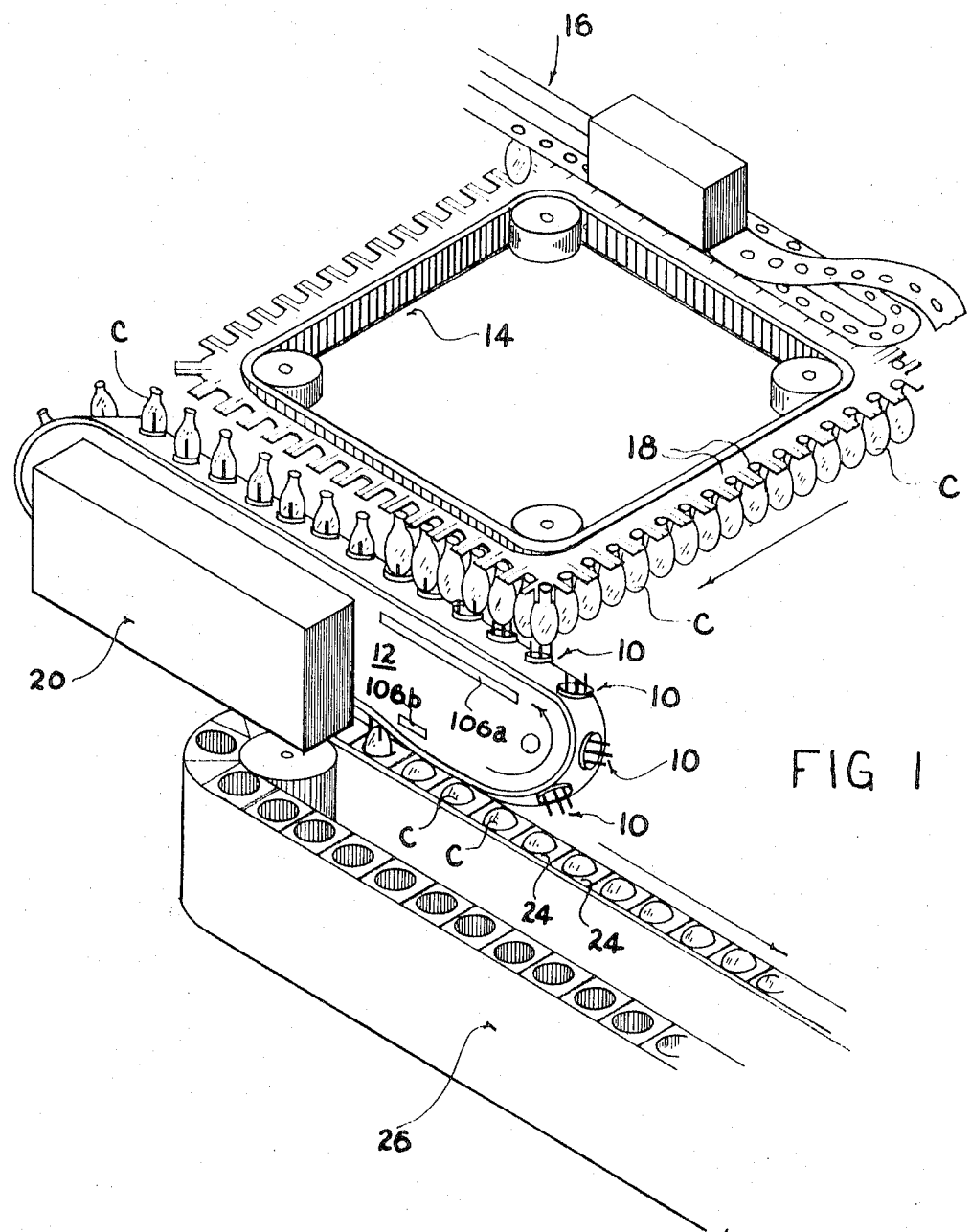
FIG. 1 is a schematic illustration showing one environment in which the chuck of the present invention is employed.

In FIG. 1, a series of chucks of the present invention are designated generally 10 and shown linked together for movement on an endless conveyor designated generally 12. In the system schematically illustrated in FIG. 1, glass containers C are automatically loaded onto chucks 10 of conveyor 12 by a transfer machine designated generally 14. Transfer machine 14 forms the subject matter of a commonly owned copending application of John D. Banyas, Ser. No. 825,850, filed May 19, 1969. The containers C are formed on a forming machine of the ribbon type, designated generally 16, with an integral moil portion M (See FIG. 2) by which the container is carried by support fork assemblies 18 during its passage through transfer machine 14. The function of chucks 10 and conveyor 12 is to carry the containers through a battery of opposed burner jets, designated generally 20, which burn off the moil M from the container body to form the container mouth or finish at the broken line designated F in FIG. 2.

Figure 2:
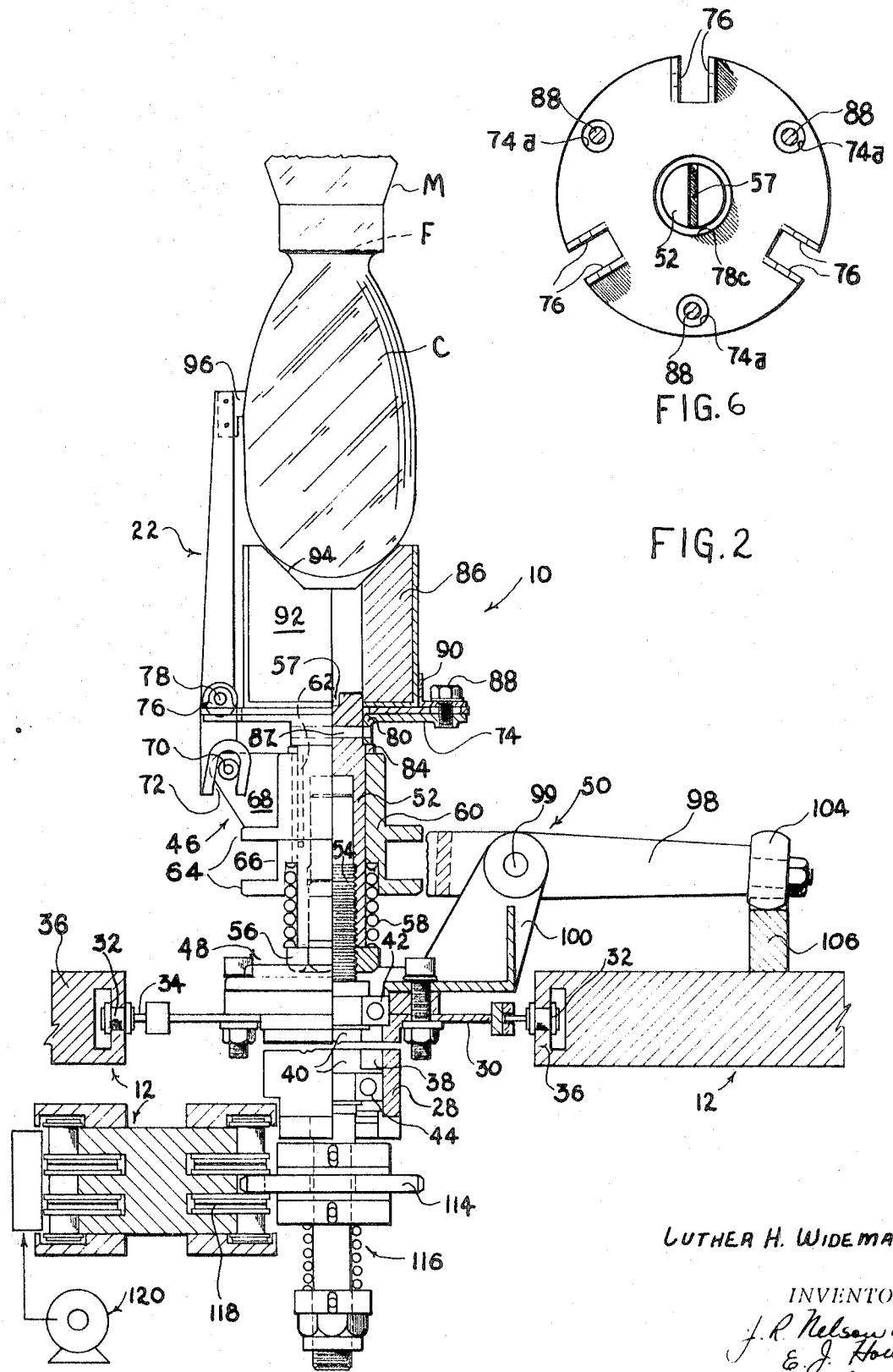
FIG. 2 is a side elevational view, partially in cross section, of the chuck.
Figure 3:
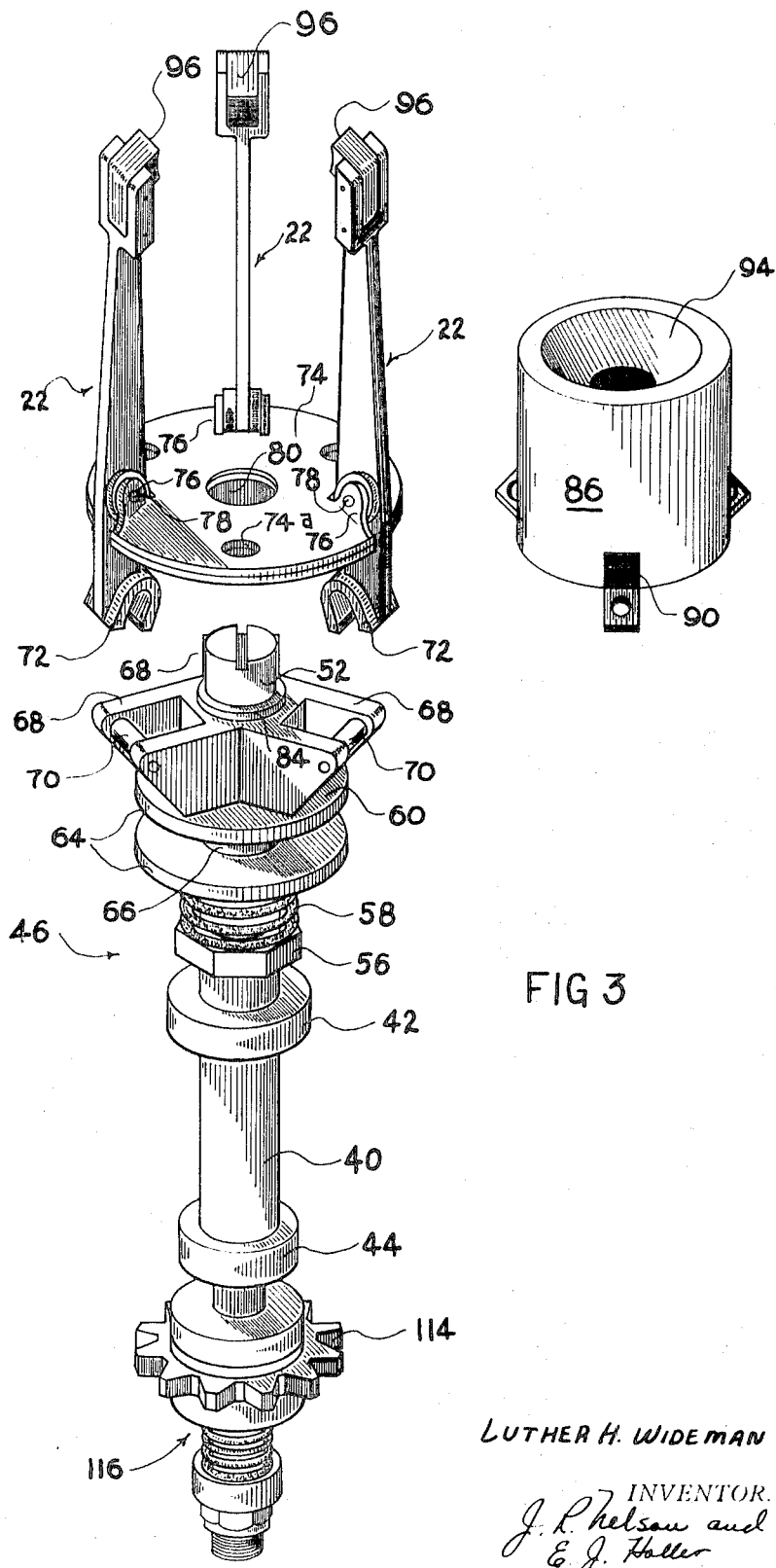
FIG. 3 is an exploded perspective view showing those portions of the chuck which are mounted for rotation.

Referring briefly to FIGS. 2 and 3, the chucks 10 are constructed with three symmetrically disposed clamping arms 22 which are adapted to engage and retain containers C upon the chucks. The arms are opened and closed, by mechanism described below, at appropriate points in their path of travel around conveyor 12 to receive containers C from transfer machine 14, to carry the containers through the burn-off device 20 and to drop the containers C into container receiving pockets 24 on a take-out conveyor designated generally 26 in FIG. 1. During their passage through burn-off device 20, the chucks are driven in rotation, by mechanism to be described below, to rotate the containers as it passes through the burner to achieve an even exposure around the circumference of the container to the action of the burner jets which extend in line along both sides of the path of travel of the container.

Figures 4, 5:
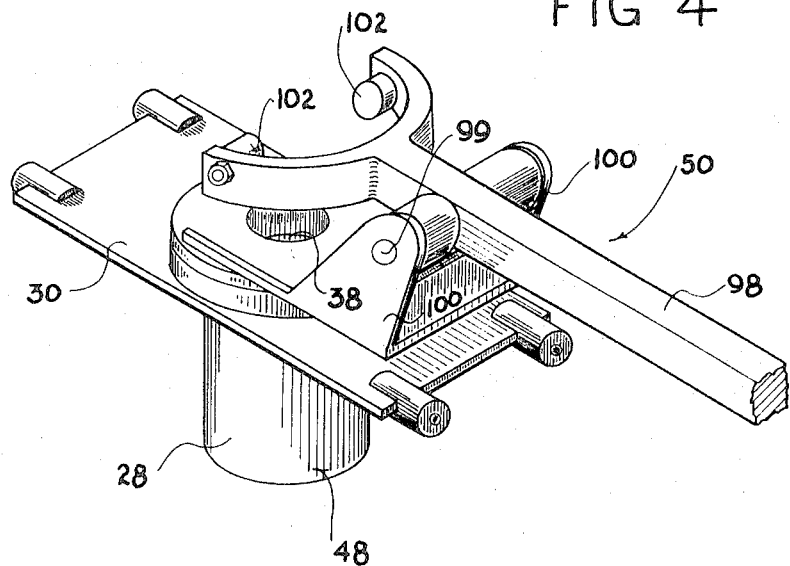
FIG. 4 is a perspective view, partially in section, showing the nonrotary portions of the chuck structure.
FIG. 5 is a detail side elevational view showing the cam slot portion of the clamping arms of the chuck.

Referring now particularly to FIGS. 2, 3 and 4, the chucks 10 are constructed with a housing 28 which is mounted for movement upon conveyor 12 as by a plate 30 fixed to the housing and supported between a pair of spaced, parallel endless chains 32 as by pins 34 carried by the chains. Chains 32 are supported and guided in movement around their respective endless paths as by chain tracks 36 mounted in the frame of conveyor 12.

Housing 28 is formed with a central bore 38 within which an elongate shaft 40 is rotatably supported as by upper and lower bearing assemblies 42 and 44 mounted within bore 38. Chuck 10 may be said to consist of two subassemblies—namely a rotary subassembly designated generally 46 (see FIG. 3), of which shaft 40 is a part, and a nonrotary subassembly designated generally 48 (FIG. 4) which includes housing 28 and a chuck actuating lever assembly designated generally 50.

Referring now particularly to FIGS. 2 and 3, shaft 40 carries an extension 52 at its upper end which is threadably secured to shaft 40 as at 54. A locknut 56 is threaded onto shaft 40 below the lower end of extension 52 to lock extension 52 at its adjusted axial position on shaft 40. As best seen in FIG. 6, extension 52 is provided with a slot 57 at its upper end which may be engaged by a screwdriver to thread extension 52 to its desired axial position relative to shaft 40. Precise axial positioning of extension 52 on shaft 40 is necessary to accurately establish the elevation of the container C above the fixed support tracks 36 on the frame of conveyor 12. The burners which sever the moil are mounted in a fixed vertical relationship to chain tracks 36 on the frame of conveyor 12, and unless the elevation of the container is accurately established, the container finish F formed by the burnoff operation may be above or below the desired location, which causes difficulties in the application of a cap or closure to the container. Locknut 56 also provides a bearing surface for a compression spring 58 which is engaged between nut 56 and an actuating sleeve 60 mounted for axial sliding movement on extension 52 and locked against rotation relative to extension 52 by a key 62.

Sleeve 60 is formed with a pair of axially spaced circumferential flanges 64 which cooperatively define an annular groove 66. Integrally formed on sleeve 60 above the uppermost flange 64 are three pair of ears 68 symmetrically disposed at locations spaced 120° apart about the sleeve circumference. Arm actuating rollers 70 are rotatably mounted between the ears to be received within cam slots 72 formed in the lower end of each clamping arm 22.

Arms 22 are pivotally supported upon the baseplate 74 of a container seat assembly. Baseplate 74 is formed with three sets of ears 76 symmetrically spaced around the plate circumference to support pivot pins 78 which pass through arm 22 at a location intermediate the ends of the arm. Baseplate 74 is supported in turn upon a support plate 80 leaving a downturned neck which is pinned to the upper end of shaft extension 52 as by pin 82. A spacer 84 is engaged between the lower end of neck 80 and the top of actuating sleeve 60 to establish the upper limit of axial movement of sleeve 60 on extension 52 under the action of compression springs 58.

A container seat 86 is secured in position upon support plate 80 as by bolts 88 passing through tabs 90 fixedly secured, as by welding, to the seat. The seat includes a centrally located insert 92 of thermally resistant material formed with a frustoconical recess 94 in its upper end which engages the hemispherical bottom of the container C to center and align the container axis with that of shaft 40. The frustoconical seat 94 cooperates with the symmetrically disposed and concurrently operated arms 22 to support the container in coaxial relationship with shaft 40. Container-engaging pads 96 of thermally resistant material are mounted at the upper end of each arm 22.

In order to assure accurate coaxial alignment of the axis of container C with the axis of shaft 40, it is essential that the three arms 22 are arranged in a precise symmetrical spacing about the shaft axis. In the event arms 22 do not close uniformly on container C, the container axis will be tilted relative to the shaft axis and, when the container passes through the burners and is rotated, will result in a nonuniform exposure of the container to the action of the burners in the case of a minor misalignment or cause the container to strike the burners in the case of a major misalignment. To enable the arms to be accurately positioned relative to the axis of shaft 40, plate 74 is supported upon support plate 80 with a capability of being adjustably positioned in any horizontal direction upon plate 80. This is accomplished by providing enlarged holes 74a (FIG. 6) through the baseplate which afford a substantial clearance to bolts 88 while a similarly enlarged central bore 78c in plate 74 provides clearance around shaft extension 52. Plate 74 is shifted upon support plate 80 until the three arms 22, when in their closed position, lie at equal radial distances from the axis of shaft 40. Plate 74 is then clamped in this adjusted position by tightening bolts 88.

Referring now particularly to FIGS. 2 and 4, axial shifting movement of the actuating sleeve 60 on extension 52 is under the control of a forked actuating lever 98 pivotally mounted by a pin 99 supported in and between a pair of brackets 100 fixedly mounted upon and projecting upwardly and outwardly from the top of housing 28. As best seen in FIG. 4, the forward end of lever 98 is forked and on the inner side of each of the forwardly projecting arms of the forked portion, rollers 102 are rotatably mounted to be received within the annular recess 66 of the actuating sleeve. At the opposite end of lever 98, a cam follower 104 is rotatably mounted upon the lever to engage, at certain locations along the path of travel of the chucks, a cam track 106 fixedly mounted upon the frame of conveyor 12. By elevating cam track 106 above the elevation shown in FIG. 2, it is believed apparent that the consequent elevating of roller 104 relative to the lever fulcrum 99 will depress the opposite end of the lever, thus causing rollers 102 to force actuating sleeve 60 axially downwardly against the action of spring 58.

Referring now FIG. 5, it will be observed that cam slot 72 in the lower end of the clamping arms 22 is formed with a first or inner section 110, the walls of which are parallel to each other, but inclined upwardly and inwardly relative to the chuck axis. A second section 112 of the slot is likewise formed with parallel walls, but the walls of section 112 extend substantially parallel to the chuck axis. When rollers 70 on sleeve 60 are engaged in the inclined section 110 of slot 72, axial movement of the roller is transmitted by the inclined walls 110 to clamping arm 22 to swing the arm about its pivot 78 in a direction dependent upon the direction of axial movement of sleeve 60. Downward movement of sleeve 60 forces the lower ends of arms 22 inwardly toward the chuck axis, thus swinging the upper ends of the arms outwardly to shift the arms to an open position. Upward movement of roller 70 along the inclined section 110 of slots 72 forces the arms inwardly toward the container-gripping position shown in FIG. 2. Maximum inward movement of the upper ends of the arms is established by limiting upward axial movement of sleeve 60 by means of ring 84, as described above.

A maximum open position of arms 22 is established by section 112 of the cam slots which is so oriented that its walls extend precisely parallel to the chuck axis when roller 70 is engaged with the section 112. Thus, axial movement of sleeve 60 while rollers 70 are engaged in sections 112 merely maintains the arms in the same position, and this position of the arms is established as the open position of the arms for reception or discharge of containers from the chuck.

Rotation of the container is accomplished by rotating subassembly 46. A sprocket 114 is frictionally coupled to the lower end of a shaft 40 as by a conventional friction coupling designated generally 116. To rotate subassembly 46 at the desired sections of the path of movement of the chuck, a sprocket engaging chain 118 is mounted in the frame of conveyor 12 to engage the sprocket as it is carried past that section of its path along which the chain 118 is located. Chain 118 may be a simple stationary chain but preferably it is formed as an endless chain and coupled to a reversible variable speed drive mechanism schematically illustrated at 120 so that the chain may be driven at selected speeds. Subassembly 46 and the gripped container will be rotated in a direction and at a rate which is proportional to the algebraic speed differential between chain 118 and the chucks. By adjusting the speed of variable speed drive 120, the rate of rotation of subassembly 46 and the supported container can be varied at will.

OPERATION

Referring now to FIG. 1, transfer machine 14, conveyor 12 and conveyor 26 are driven in the direction indicated by the directional arrows in synchronism with each other in continuous movement. Containers C are carried by the transfer machine into overlying relationship with chucks 10 moving along the upper run of conveyor 12. As the chucks 10 move into underlying relationship with containers on the transfer machine, a cam track section 106a mounted on the frame of conveyor 12 is engaged by lever rollers 104 to elevate the outer ends of the levers, thereby causing the levers to move their associated sleeves 60 downwardly to shift the chuck arms 22 to their open position.

As the chucks pass along cam track 106a, the transfer machine 14 lowers the containers downwardly through the open arms 22 of the chucks until the container bottom is rested upon the frustoconical seating surface 94. Shortly after this occurs, the chuck passes beyond the left-hand end of cam section 106a as viewed in FIG. 1, and the actuating sleeve 60 is free to move upwardly under the action of compression spring 58 to close the chuck arms, thereby gripping and centering the container in coaxial relationship with the chuck axis. The support finger assemblies 18 of transfer machine 14 are automatically withdrawn clear of the path of movement of the container in a manner described in detail in the aforementioned Banyas application Ser. No. 825,850.

The chuck, with the gripped container continues to move to the left along the upper run of conveyor 12 and then passes downwardly around the left-hand end sprocket and begins to move to the right along the lower run of conveyor 12 with the chuck and container in an inverted position. As the container begins to pass through the burner device 20, moving from left to right as viewed in FIG. 1, the sprocket 114 of the chuck moves into engagement with chain 118. Chain 118 is normally driven in a direction opposite to that of the chucks to achieve a rapid rate of rotation of the chuck and container as the container passes through the burner device.

The burner device severs the moil along the finish line (F FIG. 2) and the severed moil drops freely from the inverted container.

After the moil has been severed, the lower run of conveyor 12 passes along a slightly downwardly inclined section which lowers the container partially into a pocket 24 on conveyor 26. At the lower end of the inclined section, the lever roller 104 of the chuck engages a second cam track section 106b which opens the chuck arms to permit the container to drop downwardly from the chuck into the pocket.

While one embodiment of the invention has been described in detail, it will be apparent to those skilled in the art that the disclosed embodiment may be modified. Therefore, the foregoing description is to be considered exemplary, rather than limiting, and the true scope of the invention is that defined in the following claims.

I claim:

1. A chuck for supporting an elongate article having a longitudinal axis of symmetry comprising a housing, an elongate shaft mounted in said housing for rotation about its axis, an article seat assembly mounted on one end of said shaft for rotation therewith, centering means on said seat assembly adapted to engage one end of an article to center the article for coaxial alignment with the axis of said shaft, a plurality of elongate clamping arms on said seat assembly at symmetrically disposed positions about said shaft axis, pivot means supporting each of said arms on said seat assembly for pivotal movement in respective general planes extending radially of said shaft axis between an open article receiving position and a closed article gripping position wherein said arms engage and support the article in centered coaxial relationship to said shaft, each of said arms having a cam slot therein longitudinally offset from said pivot means, lever means pivotally mounted on said housing, and coupling means mounted on said seat assembly and engaged with said lever and said cam slots for pivoting said arms in unison about their respective pivot means in response to pivotal movement of said lever on said housing.

2. A chuck as defined in claim 1 further comprising means for rotating said shaft about its axis.

3. A chuck as defined in claim 1 wherein said coupling means comprises a sleeve mounted on said seat assembly for axial sliding movement, a plurality of cam roller means on said sleeve, each of said cam roller means being received within one of said cam slots, said slots being inclined to the axis of said shaft whereby axial movement of said sleeve causes the engagement of the cam roller means within the cam slots to pivot the arms in unison.

4. A chuck as defined in claim 3 wherein each of said slots comprises a first section inclined to said axis to cause pivotal movement of said arms in response to axial movement of said sleeve, and a second section extending parallel to said axis when said cam roller means are engaged therein to maintain said arms stationary during axial movement of said sleeve.

5. A chuck as defined in claim 3 further comprising resilient means axially biasing said sleeve in a direction urging said arms toward an article-clamping position, and stop means defining an end limit of axial movement of said sleeve in said direction to establish a closed position of said arms.

6. A chuck as defined in claim 3 wherein said lever means comprises a lever pivotally mounted intermediate its ends on said housing, means at one end of said lever engages with said sleeve and operable upon pivotal movement of said lever to shift said sleeve axially of said seat assembly.

7. A chuck as defined in claim 6 wherein said means at one end of said lever comprises actuating roller means on said lever, and means on said sleeve defining an annular groove receiving said actuating roller means.

8. A chuck as defined in claim 7 further comprising means for rotating said shaft about its axis, and means locking said sleeve against rotation relative to said shaft.

9. Container-handling apparatus comprising endless conveyor means including a conveyor frame and conveying elements supported by said frame for movement along an endless path, a plurality of container-handling chucks, each of said chucks having a housing, means mounting said housing on said conveying elements for movement therewith along said endless path, an annular container-receiving seat assembly mounted in said housing for rotation about its axis with said axis extending in a direction normal to said endless path, an annular container seat on said seat assembly coaxial with said shaft and conformed to engage and center the bottom of a container for coaxial alignment with said shaft, a plurality of container-gripping arms mounted upon said seat assembly at symmetrically disposed locations about the circumference of said container seat for movement between a container-gripping position wherein said arms are cooperable with said seat to grip and support a container thereon coaxially of said seat assembly and an open position wherein said arms are spaced apart to accommodate movement of a container axially of said seat assembly to or from said seat, arm operating means mounted upon said chuck operable to selectively locate said arms in said container-gripping position or in said open position, and means interengageable between said shaft and said conveyor frame at selected locations along said endless path for driving said seat assembly and the container supported thereon in rotation in said housing as the chuck is moved along said selected portions of said path.

10. Container-handling apparatus as defined in claim 9 wherein said arm operating means comprises a sleeve mounted upon said seat assembly for axial sliding movement, cam means coupling said sleeve to said arms for shifting said arms between said container gripping position and said open position in response to axial movement of said sleeve, lever means pivotally mounted on said housing for shifting said sleeve axially on said housing, and means on said frame at a first location adjacent said path engageable with said lever means to pivot said lever means as the chuck is advanced past said first location.

11. A chuck for supporting an elongate article having a longitudinal axis of symmetry comprising a housing, an elongate shaft mounted in said housing for rotation about its axis, an article seat assembly mounted on one end of said shaft for rotation therewith, centering means on said seat assembly adapted to engage one end of an article to center the article for coaxial alignment with the axis of said shaft, an annular fulcrum plate, a plurality of elongate clamping arms pivotally mounted on said fulcrum plate at symmetrically disposed positions about the center of said plate, means for mounting said plate on said seat assembly at a selected position of adjustment wherein said arms are symmetrically disposed about said shaft axis, lever means pivotally mounted on said housing, and coupling means mounted on said seat assembly and engaged with said lever for pivoting said arms in unison about their respective pivot means between an open article-receiving position wherein said arms engage and support the article in centered coaxial relationship to said shaft in response to pivotal movement of said lever on said housing.

12. A chuck as defined in claim 11 wherein said means for mounting said plate comprises a flange on said shaft having an upwardly facing radially extending support surface for supporting said plate, and means for clamping said plate to said support surface at selected positions thereon.

13. A chuck for supporting an elongate article having a longitudinal axis of symmetry comprising a housing, an elongate shaft mounted in said housing for rotation about its axis, an article seat assembly mounted on one end of said shaft for rotation therewith, adjusting means for locking said seat assembly at selected positions of axial adjustment on said shaft, centering means on said seat assembly adapted to engage one end of an article to center the article for coaxial alignment with the axis of said shaft, a plurality of elongate clamping arms on said seat assembly at symmetrically disposed positions about said shaft axis, support means supporting said arms on said seat assembly for coordinated movement between an open article receiving position and a closed article gripping position wherein said arms engage and support the article in centered coaxial relationship to said shaft, lever means pivotally mounted on said housing, and coupling means mounted on said seat assembly and engaged with said lever shifting said arms in unison between their open and closed position in response to pivotal movement of said lever on said housing.